(12) United States Patent
Ohki

(10) Patent No.: US 10,344,801 B2
(45) Date of Patent: Jul. 9, 2019

(54) BEARING PART AND ROLLING BEARING

(71) Applicant: NTN CORPORATION, Osaka-shi, Osaka (JP)

(72) Inventor: Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/794,841

(22) Filed: Oct. 26, 2017

(65) Prior Publication Data

US 2018/0045246 A1 Feb. 15, 2018

Related U.S. Application Data

(62) Division of application No. 14/767,250, filed as application No. PCT/JP2014/052447 on Feb. 3, 2014.

(30) Foreign Application Priority Data

Feb. 13, 2013 (JP) .................................. 2013-025459

(51) Int. Cl.
*F16C 33/64* (2006.01)
*C21D 9/40* (2006.01)
(Continued)

(52) U.S. Cl.
CPC ............... *F16C 33/64* (2013.01); *C21D 1/06* (2013.01); *C21D 9/40* (2013.01); *C22C 38/00* (2013.01); *C22C 38/002* (2013.01); *C22C 38/02* (2013.01); *C22C 38/04* (2013.01); *C22C 38/42* (2013.01); *C22C 38/44* (2013.01); *C23C 8/32* (2013.01);
(Continued)

(58) Field of Classification Search
CPC .... C21D 9/40; C21D 1/06; C23C 8/32; C23C 8/80; C22C 38/34
See application file for complete search history.

(56) References Cited

U.S. PATENT DOCUMENTS

| | | | |
|---|---|---|---|
| 5,658,082 A | 8/1997 | Tsushima et al. | |
| 6,325,867 B1 | 12/2001 | Okita et al. | |

(Continued)

FOREIGN PATENT DOCUMENTS

| | | | |
|---|---|---|---|
| CN | 1424425 A | 6/2003 | |
| CN | 1611628 A | 5/2005 | |

(Continued)

OTHER PUBLICATIONS

International Search Report PCT/JP2014/052447 dated Apr. 28, 2014 with English translation.

(Continued)

*Primary Examiner* — Jessee R Roe
(74) *Attorney, Agent, or Firm* — McDermott Will & Emery LLP

(57) ABSTRACT

Each of an outer race (10), an inner race (11) and a ball (12) as a bearing part is a bearing part made of JIS standard SUJ2 and having a carbonitrided layer formed in a surface thereof, wherein, after heat treatment at a heating temperature of 500° C. for a retention time of one hour is performed, a Vickers hardness at a position with a depth of $0.02 \times T + 0.175$ (mm) from the surface is higher than a Vickers hardness at a core portion, which is a region where the carbonitrided layer is not formed in a thickness direction of the bearing part, by not less than 80 HV, where T represents the time of carbonitriding treatment for forming the carbonitrided layer.

3 Claims, 11 Drawing Sheets

(51) Int. Cl.

| | |
|---|---|
| *C23C 8/32* | (2006.01) |
| *C21D 1/06* | (2006.01) |
| *C22C 38/00* | (2006.01) |
| *C22C 38/44* | (2006.01) |
| *F16C 33/32* | (2006.01) |
| *F16C 33/34* | (2006.01) |
| *C22C 38/02* | (2006.01) |
| *C22C 38/04* | (2006.01) |
| *C22C 38/42* | (2006.01) |
| *F16C 33/62* | (2006.01) |
| *C23C 8/80* | (2006.01) |
| *F16C 19/06* | (2006.01) |
| *F16C 19/26* | (2006.01) |
| *F16C 19/30* | (2006.01) |
| *F16C 19/36* | (2006.01) |

(52) U.S. Cl.
CPC ............... *C23C 8/80* (2013.01); *F16C 33/32* (2013.01); *F16C 33/34* (2013.01); *F16C 33/62* (2013.01); *F16C 19/06* (2013.01); *F16C 19/26* (2013.01); *F16C 19/30* (2013.01); *F16C 19/364* (2013.01)

(56) References Cited

U.S. PATENT DOCUMENTS

| | | |
|---|---|---|
| 2009/0038713 A1 | 2/2009 | Ueda et al. |
| 2011/0243488 A1 | 10/2011 | Kizawa et al. |
| 2013/0019666 A1 | 1/2013 | Ohki |

FOREIGN PATENT DOCUMENTS

| | | |
|---|---|---|
| CN | 1955446 A | 5/2007 |
| CN | 101400809 A | 4/2009 |
| CN | 102859025 A | 1/2013 |
| EP | 1 517 058 A1 | 3/2005 |
| EP | 1701052 A2 | 9/2006 |
| EP | 2554709 A1 | 2/2013 |
| JP | 05-240253 A | 9/1993 |
| JP | 06-341441 A | 12/1994 |
| JP | 11-304795 A | 11/1999 |
| JP | 2009-229288 A | 10/2009 |
| JP | 2011-209021 A | 10/2011 |
| WO | 2012/141639 A1 | 10/2012 |

OTHER PUBLICATIONS

Youichi Watanabe et al., "Effects of Nitrogen Content on Microstructure and Resistance to Softening during Tempering of Carbo-Nitrided Chromium Alloy Steels", Heat Treatment, vol. 40, (2000), pp. 18-24 with English translation.

Chikara Ohki et al., "Estimation of Scratched Contact Fatigue Life with Artificial Dent of SUJ2 Steel Carbonitrided to Controlled Surface Nitrogen Content", Iron and Steel, vol. 95, No. 10, (2009), pp. 695-703 with English Abstract.

Hyojiro Kurabe et al., "Rolling Fatigue Characteristics of Carburized or Carbonitrided 1% Cr Steel at Elevated Temperatures", Iron and Steel, vol. 11, (1967), pp. 1305-1308 with English translation.

Supplementary European Search Report EP Application No. 14752028.2 dated May 30, 2016.

Notice of Grounds of Rejection Japanese Patent Application No. 2013-025459 dated Jul. 12, 2016 with full English translation.

First Office Action dated Oct. 19, 2016, cited in corresponding Chinese Patent Application No. 201480008467.9, with English language translation.

Non-Final Office Action issued in related U.S. Appl. No. 14/767,250, dated Nov. 17, 2017.

Chinese Office Action issued in corresponding Chinese Patent Application No. 201710660387.7, dated Aug. 28, 2018, with English Translation.

BEARING PART AND ROLLING BEARING

CROSS-REFERENCE TO RELATED APPLICATIONS

This application is a divisional of U.S. application Ser. No. 14/767,250, filed Aug. 11, 2015, which is the U.S. National Phase under 35 U.S.C. § 371 of International Application No. PCT/JP2014/052447, filed Feb. 3, 2014, which claims the benefit of Japanese Patent Application No. 2013-025459 filed on Feb. 13, 2013 including the specification, drawings and abstract are incorporated herein by reference in their entirety.

TECHNICAL FIELD

The present invention relates to a bearing part and a rolling bearing, and more particularly to a bearing part having a carbonitrided layer formed in a surface thereof, and a rolling bearing including the bearing part.

BACKGROUND ART

It has been conventionally qualitatively known that carbonitriding treatment is effective to extend rolling contact fatigue life of a rolling bearing (see, for example, Japanese Patent Laying-Open No. 6-341441 (PTD 1) and "Rolling Fatigue Characteristics of Carburized or Carbonitrided 1% Cr Steel at Elevated Temperatures" by Hyojiro Kurabe et al., Iron and Steel, vol. 11, (1967), pp. 1305-1308 (NPD 1)). Further, in recent years, it has become clear that carbonitriding treatment is also effective in a method for evaluating dent-originated peeling life of a rolling bearing, which is a more quantitative method (see, for example, Japanese Patent Laying-Open No. 2009-229288 (PTD 2)). It has also become clear that, if a nitrogen concentration in a product uppermost surface is not less than 0.1 mass %, the life is extended to the extent that its statistically significant difference from that of a non-nitrided part is reliably recognized. In addition, it has also been found that, if the nitrogen concentration in the product uppermost surface (raceway surface or rolling surface) is assured to be not less than 0.4 mass %, the life is further extended as compared with the case of not less than 0.1 mass % (see, for example, "Estimation of Scratched Contact Fatigue Life with Artificial Dent of SUJ2 Steel Carbonitrided to Controlled Surface Nitrogen Content" by Chikara Ohki et al., Iron and Steel, vol. 95, (2009), pp. 695-703 (NPD 2)). Accordingly, if it is possible to provide a component of a rolling bearing which is assured to have a nitrogen concentration of not less than 0.4 mass % in a product uppermost surface, safety of a rolling bearing is assured more reliably, providing a great social advantage as a result.

At present, however, a nitrogen concentration in steel can be quantified only by a method performed using analysis equipment such as an EPMA (Electron Probe Micro Analyzer) and a GDS (Glow Discharge Spectrometer), and such a method requires a great number of man-hours. Therefore, if such a method is adopted as a method for quality assurance, the rolling bearing becomes very expensive, which is not practical.

In addition, a method for qualitatively evaluating the degree of nitridation by utilizing the characteristics that, when nitrogen has entered steel, the hardness after high-temperature tempering becomes higher than that of a non-nitrided portion is described (see, for example, "Effects of Nitrogen Content on Microstructure and Resistance to Softening during Tempering of Carbo-Nitrided Chromium Alloy Steels" by Youichi Watanabe et al., Heat Treatment, vol. 40, (2000), pp. 18-24 (NPD 3)). Furthermore, there has also been proposed a method for providing a component of a rolling bearing which is assured to have a nitrogen concentration of not less than 0.1 mass % in a product uppermost surface, by using the aforementioned characteristics to measure a cross sectional hardness distribution after high-temperature tempering (see, for example, Japanese Patent Laying-Open No. 2011-209021 (PTD 3)).

CITATION LIST

Patent Document

PTD 1: Japanese Patent Laying-Open No. 6-341441
PTD 2: Japanese Patent Laying-Open No. 2009-229288
PTD 3: Japanese Patent Laying-Open No. 2011-209021

Non Patent Document

NPD 1: "Rolling Fatigue Characteristics of Carburized or Carbonitrided 1% Cr Steel at Elevated Temperatures" by Hyojiro Kurabe et al., Iron and Steel, vol. 11, (1967), pp. 1305-1308
NPD 2: "Estimation of Scratched Contact Fatigue Life with Artificial Dent of SUJ2 Steel Carbonitrided to Controlled Surface Nitrogen Content" by Chikara Ohki et al., Iron and Steel, vol. 95, (2009), pp. 695-703
NPD 3: "Effects of Nitrogen Content on Microstructure and Resistance to Softening during Tempering of Carbo-Nitrided Chromium Alloy Steels" by Youichi Watanabe et al., Heat Treatment, vol. 40, (2000), pp. 18-24

SUMMARY OF INVENTION

Technical Problem

According to the method proposed in PTD 3 described above, it is possible to assure that the nitrogen concentration in the product uppermost surface is not less than 0.1 mass %, whereas it is difficult to assure a higher nitrogen concentration. Therefore, from the perspective of assuring a higher degree of safety in the rolling bearing, there is a demand for providing a bearing part which is assured to have a higher nitrogen concentration.

The present invention has been made in view of the aforementioned problem, and an object of the present invention is to provide a bearing part which is quantitatively assured to have a higher nitrogen concentration than that of a conventional one, and a rolling bearing including the bearing part.

Solution to Problem

A bearing part in accordance with one aspect of the present invention is a bearing part made of JIS standard SUJ2 and having a carbonitrided layer formed in a surface thereof. In the bearing part, after heat treatment at a heating temperature of 500° C. for a retention time of one hour is performed, a Vickers hardness at a position with a depth of $0.02 \times T + 0.175$ (mm) from the surface is higher than a Vickers hardness at a core portion, which is a region where the carbonitrided layer is not formed in a thickness direction of the bearing part, by not less than 80 HV, where T represents the time of carbonitriding treatment for forming the carbonitrided layer.

A conventional bearing part can assure that a nitrogen concentration in a surface is 0.1 mass %, by utilizing the fact that there is a correlation between a Vickers hardness and a nitrogen concentration in the carbonitrided layer subjected to the aforementioned heat treatment (at a heating temperature of 500° C. for a retention time of one hour), and that nitrogen concentration distribution is shifted toward an inner side in the thickness direction by a predetermined distance (0.03 mm) due to the aforementioned heat treatment. Namely, the Vickers hardness at the position with the depth of 0.03 (mm) from the surface subjected to heat treatment as described above is improved as compared with that at the core portion which is a region where the carbonitrided layer is not formed, by a predetermined value, in accordance with the nitrogen concentration at the position (i.e., the nitrogen concentration in the surface before the aforementioned heat treatment is performed). Therefore, by setting a reference value for an improvement amount of the Vickers hardness caused by the aforementioned heat treatment beforehand in accordance with a designed nitrogen concentration in the surface of the bearing part before the aforementioned heat treatment is performed, and determining whether or not a difference between a measurement value of the Vickers hardness at the position with the depth of 0.03 (mm) from the surface subjected to the aforementioned heat treatment and a measurement value of the Vickers hardness at the core portion satisfies the reference value (i.e., whether or not the difference is more than the reference value), whether or not the nitrogen concentration in the surface of the bearing part is not less than the designed nitrogen concentration (0.1 mass %) can be determined.

However, when the nitrogen concentration is in a range of not more than 0.1 mass %, the aforementioned correlation between the Vickers hardness and the nitrogen concentration in the carbonitrided layer is strong, whereas when the nitrogen concentration is in a range of more than 0.1 mass %, the correlation is relatively weak. Therefore, in the conventional bearing part, it has been difficult to assure that the nitrogen concentration in the surface is not less than 0.4 mass %.

Thus, the inventor of the present invention has arrived at the present invention by utilizing the fact that a distance between a depth position with a nitrogen concentration of 0.06 mass % and a depth position with a nitrogen concentration of 0.4 mass % is represented by 0.02×T+0.145 (mm) (T: the time of the carbonitriding treatment), in addition to the fact that the aforementioned correlation is strong when the nitrogen concentration is in the range of not more than 0.1 mass % and that the nitrogen concentration distribution is shifted in the thickness direction by 0.03 (mm) due to the aforementioned heat treatment. Based on the aforementioned correlation, the improvement amount of the Vickers hardness corresponding to the nitrogen concentration of 0.06 mass % is 80 ΔHV. Therefore, by determining whether or not a difference between a measurement value of the Vickers hardness at the position with the depth of 0.02×T+0.175 (mm) (0.02×T+0.145+0.03 mm) from the surface and the measurement value of the Vickers hardness at the core portion is not less than 80 ΔHV which is the reference value, it is assured that the nitrogen concentration at the position with the depth of 0.02×T+0.145 (mm) from the surface is not less than 0.06 mass % before the aforementioned heat treatment, and as a result, it is assured that the nitrogen concentration in the surface is not less than 0.4 mass %. Therefore, according to the bearing part in accordance with one aspect of the present invention, there can be provided a bearing part which is quantitatively assured to have a higher nitrogen concentration than that of the conventional bearing part.

In the bearing part, the time of the carbonitriding treatment may be not less than 4 hours and not more than 10 hours. In addition, the time of the carbonitriding treatment may be not less than 6 hours and not more than 8 hours. When the time of the carbonitriding treatment is not less than 4 hours and not more than 10 hours, a Vickers hardness at a position with a depth of not less than 0.26 (mm) and not more than 0.38 (mm) from the surface is higher than the Vickers hardness at the core portion by not less than 80 HV. When the time of the carbonitriding treatment is not less than 6 hours and not more than 8 hours, a Vickers hardness at a position with a depth of not less than 0.3 (mm) and not more than 0.34 (mm) from the surface is higher than the Vickers hardness at the core portion by not less than 80 HV.

If the time of the carbonitriding treatment is shorter than 4 hours, the carbonitrided layer cannot be formed deeply, and thus, it is difficult to set the nitrogen concentration in the surface to be not less than 0.4 mass % when a grinding allowance is required after the heat treatment. On the other hand, if the time of the carbonitriding treatment exceeds 10 hours, an amount of remaining austenite becomes excessive and the bearing part is likely to have a low hardness, and further, the bearing part undergoes a significant dimensional change over time. Therefore, it is preferable to select the time of the carbonitriding treatment as appropriate within a range that can assure the durability and dimensional stability of the bearing part (not less than 4 hours and not more than 10 hours).

A bearing part in accordance with another aspect of the present invention is a bearing part made of JIS standard SUJ2 and having a carbonitrided layer formed in a surface thereof. In the bearing part, after heat treatment at a heating temperature of 500° C. for a retention time of one hour is performed after carbonitriding treatment for forming the carbonitrided layer and before grinding processing of the surface, a Vickers hardness at a position with a depth of 0.02×T+0.175+t (mm) from the surface is higher than a Vickers hardness at a core portion, which is a region where the carbonitrided layer is not formed in a thickness direction of the bearing part, by not less than 80 HV, where T represents the time of the carbonitriding treatment and t (mm) represents a thickness of the bearing part removed by the grinding processing.

In the bearing part in accordance with another aspect of the present invention, by determining whether or not a difference between a measurement value of a Vickers hardness at a position with a depth where the thickness of the bearing part removed by the grinding processing is preliminarily taken into consideration, i.e., at a position with a depth of 0.02×T+0.175 (mm) plus aforementioned thickness t (mm), and the measurement value of the Vickers hardness at the core portion is not less than 80 ΔHV, it is possible to assure that the nitrogen concentration in the surface subjected to the grinding processing is not less than 0.4 mass % even before the grinding processing is performed. Therefore, according to the bearing part in accordance with another aspect of the present invention, there can be provided a bearing part which is quantitatively assured to have a higher nitrogen concentration than that of the conventional bearing part, similarly to the aforementioned bearing part in accordance with one aspect of the present invention.

In the bearing part, the time of the carbonitriding treatment may be not less than 4 hours and not more than 10 hours, and the thickness may be not more than 0.125 (mm).

In addition, the time of the carbonitriding treatment may be not less than 6 hours and not more than 8 hours, and the thickness may be not more than 0.15 (mm).

As described above, by determining the thickness of the bearing part removed by the grinding processing in accordance with the time of the carbonitriding treatment, a high nitrogen concentration in the surface subjected to the grinding processing can be assured and deformation of the bearing part caused by the heat treatment can be corrected.

In the bearing part, the carbonitriding treatment may be performed in a temperature range of not less than 840° C. and not more than 860° C.

If the temperature of the carbonitriding treatment is lower than 840° C., the diffusion speed of nitrogen in steel decreases and the time of the carbonitriding treatment becomes longer. On the other hand, if the temperature of the carbonitriding treatment exceeds 860° C., the decomposition reaction speed of $NH_3$ increases and it becomes difficult to keep an undecomposed $NH_3$ fraction high, and as a result, the treatment time for assuring a high nitrogen concentration in the surface subjected to grinding becomes longer. In addition, a prior austenite crystal grain size is likely to become coarse. For these reasons, the temperature range of the carbonitriding treatment is preferably not less than 840° C. and not more than 860° C., and more preferably 850° C.

In the bearing part, a prior austenite crystal grain size may be within a range of JIS standard No. 9 to No. 11. The prior austenite crystal grain size depends on the heating temperature during the carbonitriding treatment. Therefore, by confirming that the prior austenite crystal grain size in the bearing part is within the aforementioned range, it can be confirmed that the carbonitriding treatment is being performed at an appropriate temperature.

A rolling bearing in accordance with the present invention includes the bearing part in accordance with the present invention which is quantitatively assured to have a higher nitrogen concentration as compared with the conventional bearing part. Therefore, according to the rolling bearing in accordance with the present invention, there can be provided a rolling bearing in which the rolling contact fatigue life is extended and a higher degree of safety is assured as compared with the conventional rolling bearing.

The rolling bearing may be any one of a deep groove ball bearing, a conical roller bearing, a cylindrical roller bearing, and a needle roller bearing. The rolling bearing in accordance with the present invention which is assured to have a higher degree of safety is suitable as a rolling bearing such as a deep groove ball bearing, a conical roller bearing, a cylindrical roller bearing, and a needle roller bearing.

Advantageous Effects of Invention

As is clear from the foregoing description, according to the bearing part in accordance with the present invention, there can be provided a bearing part which is quantitatively assured to have a higher nitrogen concentration. In addition, according to the rolling bearing in accordance with the present invention, there can be provided a rolling bearing which is assured to have a higher degree of safety.

DESCRIPTION OF EMBODIMENTS

Figure 1:
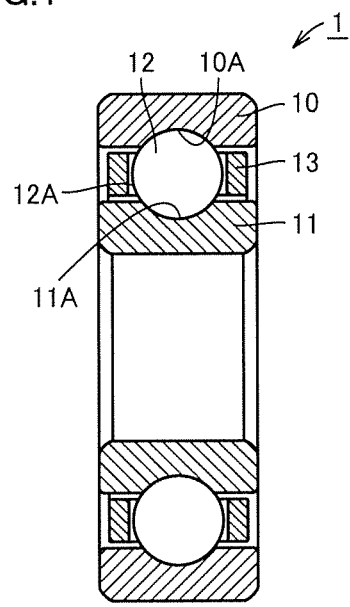
FIG. 1 is a schematic cross-sectional view showing a structure of a deep groove ball bearing.

An embodiment of the present invention will be described hereinafter with reference to the drawings. In the following drawings, the same or corresponding portions are denoted by the same reference numerals, and description thereof will not be repeated.

First, a structure of a deep groove ball bearing 1, which is a rolling bearing according to one embodiment of the present invention, will be described. Referring to FIG. 1, deep groove ball bearing 1 mainly includes an outer race 10, an inner race 11, a plurality of balls 12, and a holder 13.

Outer race 10 has an annular shape and has an outer race raceway surface 10A on an inner circumferential surface thereof. Inner race 11 has an annular shape and has an inner race raceway surface 11A on an outer circumferential surface thereof. Inner race 11 is arranged on the inner side of outer race 10 such that inner race raceway surface 11A faces outer race raceway surface 10A. Outer race 10 and inner race 11 have an outer diameter of, for example, not more than 150 mm.

By holder 13 made of synthetic resin, balls 12 are aligned at a predetermined pitch on an annular raceway along the circumferential direction of outer race 10 and inner race 11, and are held on the raceway in a freely rolling manner. Ball 12 has a ball rolling surface 12A and is in contact with outer race raceway surface 10A and inner race raceway surface 11A at ball rolling surface 12A. With such a configuration, outer race 10 and inner race 11 of deep groove ball bearing 1 are relatively rotatable with respect to each other.

Outer race 10, inner race 11 and ball 12 are each a bearing part according to the present embodiment made of JIS standard SUJ2 and having a carbonitrided layer formed in a surface (outer race raceway surface 10A, inner race raceway surface 11A and ball rolling surface 12A) thereof. In outer race 10, inner race 11 and ball 12, after heat treatment (hereinafter referred to as "high-temperature tempering") at a heating temperature of 500° C. for a retention time of one hour is performed, a Vickers hardness at a position with a depth of 0.02×T+0.175 (mm) from the surface is higher than a Vickers hardness at a core portion, which is a region where the carbonitrided layer is not formed in a thickness direction of the bearing part (outer race 10, inner race 11 and ball 12), by not less than 80 HV, where T represents the time of carbonitriding treatment for forming the carbonitrided layer. This assures that a nitrogen concentration in the aforementioned surface of the aforementioned bearing part is not less than 0.4 mass % as described below. As a result, a higher degree of safety can be assured for deep groove ball bearing 1 including outer race 10, inner race 11 and ball 12.

In accordance with the aforementioned relational equation of (0.02×T+0.175), when the time (T) of the carbonitriding treatment is not less than 4 hours and not more than 10 hours, a Vickers hardness at a position with a depth of not less than 0.26 (mm) and not more than 0.38 (mm) from the aforementioned surface is higher than the Vickers hardness at the aforementioned core portion by not less than 80 HV. When the time (T) of the carbonitriding treatment is not less than 6 hours and not more than 8 hours, a Vickers hardness at a position with a depth of not less than 0.3 (mm) and not more than 0.34 (mm) from the aforementioned surface is higher than the Vickers hardness at the aforementioned core portion by not less than 80 HV.

In addition, in outer race 10, inner race 11 and ball 12, after high-temperature tempering is performed after carbonitriding treatment for forming the carbonitrided layer and before grinding processing of the surface, a Vickers hardness at a position with a depth of 0.02×T+0.175+t (mm) from the surface is higher than a Vickers hardness at a core portion, which is a region where the carbonitrided layer is not formed in a thickness direction of the bearing part, by not less than 80 HV, where T represents the time of the carbonitriding treatment and t (mm) represents a thickness of the bearing part removed by the grinding processing. This can assure that the nitrogen concentration in the aforementioned surface subjected to the grinding processing is not less than 0.4 mass % even before the grinding processing is performed.

In the aforementioned bearing part, when the time (T) of the carbonitriding treatment is not less than 4 hours and not more than 10 hours, the aforementioned thickness (t) may be not more than 0.125 (mm). When the time (T) of the carbonitriding treatment is not less than 6 hours and not more than 8 hours, the aforementioned thickness (t) may be not more than 0.15 (mm).

In addition, in outer race 10 and inner race 11, the thickness (hereinafter referred to as "grinding allowance for one surface") of the aforementioned bearing part removed by the grinding processing is determined in consideration of an amount of deformation and an amount of dimensional change caused by the heat treatment, and the amount of deformation and the amount of dimensional change vary depending on the shape, thickness, cooling conditions and heating conditions of outer race 10 and inner race 11. Therefore, an average value of the grinding allowance for one surface for outer race raceway surface 10A of outer race 10 and inner race raceway surface 11A of inner race 11 is determined for each model number of the bearing, based on an actual value. When outer race 10 and inner race 11 have an outer diameter of not more than 150 (mm) as in the present embodiment, the average value of the grinding allowance for one surface for outer race raceway surface 10A and inner race raceway surface 11A is within a range of not less than 0.1 mm and not more than 0.2 mm.

As described above, in outer race 10, inner race 11 and ball 12, the time of the carbonitriding treatment for forming the carbonitrided layer is preferably within the range of not less than 4 hours and not more than 10 hours, and more preferably within the range of not less than 6 hours and not more than 8 hours. If the time of the carbonitriding treatment is shorter than 4 hours, the carbonitrided layer cannot be formed sufficiently and it is difficult to sufficiently extend the rolling contact fatigue life of the bearing part. On the other hand, if the time of the carbonitriding treatment exceeds 10 hours, an amount of remaining austenite becomes excessive and the bearing part undergoes a significant dimensional change over time. Therefore, from the perspective of providing a bearing part excellent in durability and dimensional stability, it is preferable to set the time of the carbonitriding treatment to be within the aforementioned range.

In addition, in outer race 10, inner race 11 and ball 12, the temperature of the carbonitriding treatment for forming the carbonitrided layer is preferably not less than 840° C. and not more than 860° C. If the temperature of the carbonitriding treatment is lower than 840° C., the diffusion speed of nitrogen in steel decreases, and thus, the time of the carbonitriding treatment needs to be extended. On the other hand, if the time of the carbonitriding treatment exceeds 860° C., an amount of entry of nitrogen into steel decreases, and thus, a region having a high nitrogen concentration is formed to be biased toward the surface side of the bearing part. As a result, the time of the carbonitriding treatment needs to be extended to increase the nitrogen concentration in the surface. For these reasons, the temperature of the carbonitriding treatment is preferably not less than 840° C. and not more than 860° C., and more preferably 850° C.

In addition, the temperature of the carbonitriding treatment can be determined in accordance with a prior austenite crystal grain size after hardening. For example, when the temperature of the carbonitriding treatment is 850° C., the prior austenite crystal grain size of the aforementioned bearing part (outer race 10, inner race 11 and ball 12) made of JIS standard SUJ2 is within a range of JIS standard No. 9 to No. 11. Therefore, based on the prior austenite crystal grain size after hardening, it can be confirmed that the carbonitriding treatment has been performed at an appropriate temperature.

Figure 3:
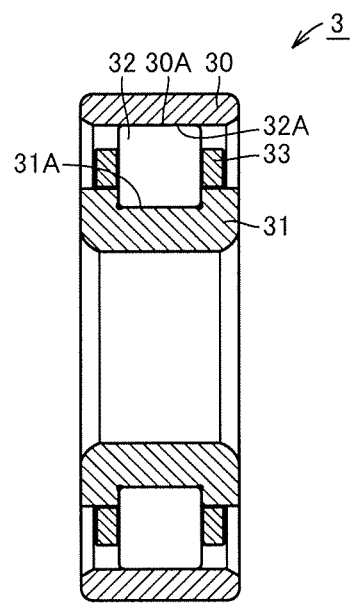
FIG. 3 is a schematic cross-sectional view showing a structure of a cylindrical roller bearing.
Figure 4:
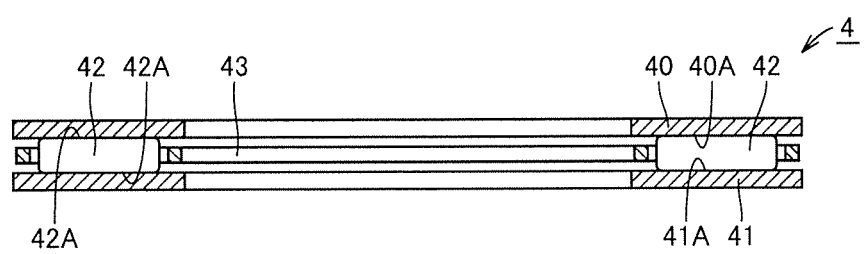
FIG. 4 is a schematic cross-sectional view showing a structure of a thrust needle roller bearing.

In addition, the rolling bearing according to the present invention is not limited to deep groove ball bearing 1 and may be any one of a conical roller bearing 2 (see FIG. 2), a cylindrical roller bearing 3 (see FIG. 3), and a thrust needle roller bearing 4 (see FIG. 4). The structure of each of conical roller bearing 2, cylindrical roller bearing 3 and thrust needle roller bearing 4 will be described hereinafter.

Figure 2:
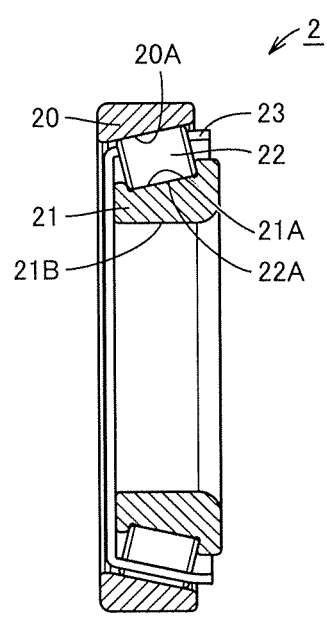
FIG. 2 is a schematic cross-sectional view showing a structure of a conical roller bearing.

First, the structure of conical roller bearing 2 will be described with reference to FIG. 2. Conical roller bearing 2 mainly includes an outer race 20, an inner race 21, a plurality of rollers 22, and a holder 23. Outer race 20 has an annular shape and has an outer race raceway surface 20A on an inner circumferential surface thereof. Inner race 21 has an annular shape and has an inner race raceway surface 21A on an outer circumferential surface thereof. Inner race 21 is arranged on the inner side of outer race 20 such that inner race raceway surface 21A faces outer race raceway surface 20A.

Rollers 22 are in contact with inner race raceway surface 21A and outer race raceway surface 20A, and are circumferentially arranged at a predetermined pitch by holder 23 made of synthetic resin. As a result, rollers 22 are held on an annular raceway of outer race 20 and inner race 21 in a freely rolling manner. In addition, conical roller bearing 2 is configured such that apexes of a cone including outer race raceway surface 20A, a cone including inner race raceway surface 21A and a cone including a path of a rotation axis when rollers 22 roll intersect at one point on a center line of the bearing. With such a configuration, outer race 20 and inner race 21 of conical roller bearing 2 are relatively rotatable with respect to each other.

Similarly to outer race 10, inner race 11 and ball 12, outer race 20, inner race 21 and roller 22 are each a bearing part according to the present embodiment. Therefore, in outer race 20, inner race 21 and roller 22, after high-temperature tempering is performed, a Vickers hardness at a position with a depth of 0.02×T+0.175 (mm) from the surface (outer race raceway surface 20A, inner race raceway surface 21 and a roller rolling surface 22A) is higher than a Vickers hardness at a core portion, which is a region where the carbonitrided layer is not formed in a thickness direction of the bearing part (outer race 20, inner race 21 and roller 22), by not less than 80 HV, where T represents the time of carbonitriding treatment for forming the carbonitrided layer. This assures that a nitrogen concentration in the aforementioned surface of outer race 20, inner race 21 and roller 22 is not less than 0.4 mass %. As a result, a higher degree of safety is assured for conical roller bearing 2 as well.

Next, the structure of cylindrical roller bearing 3 will be described with reference to FIG. 3. Cylindrical roller bearing 3 mainly includes an outer race 30, an inner race 31, a plurality of rollers 32, and a holder 33. Outer race 30 has an annular shape and has an outer race raceway surface 30A formed on an inner circumferential surface thereof. Inner race 31 has an annular shape and has an inner race raceway surface 31A formed on an outer circumferential surface thereof. Inner race 31 is arranged on the inner side of outer race 30 such that inner race raceway surface 31A faces outer race raceway surface 30A.

Roller 32 has a cylindrical shape and is in contact with inner race raceway surface 31A and outer race raceway surface 30A at a roller rolling surface 32A. In addition, rollers 32 are circumferentially arranged at a predetermined pitch by holder 33 made of synthetic resin, and thus, are held on an annular raceway of outer race 30 and inner race 31 in a freely rolling manner. With such a configuration, outer race 30 and inner race 31 of cylindrical roller bearing 3 are relatively rotatable with respect to each other.

Similarly to outer race 10, inner race 11 and ball 12, outer race 30, inner race 31 and roller 32 are each a bearing part according to the present embodiment. Therefore, in outer race 30, inner race 31 and roller 32, after high-temperature tempering is performed, a Vickers hardness at a position with a depth of 0.02×T+0.175 (mm) from the surface (outer race raceway surface 30A, inner race raceway surface 31A and roller rolling surface 32A) is higher than a Vickers hardness at a core portion, which is a region where the carbonitrided layer is not formed in a thickness direction of the bearing part (outer race 30, inner race 31 and roller 32), by not less than 80 HV, where T represents the time of carbonitriding treatment for forming the carbonitrided layer. This assures that a nitrogen concentration in the aforementioned surface of outer race 30, inner race 31 and roller 32 is not less than 0.4 mass %. As a result, a higher degree of safety is assured for cylindrical roller bearing 3 as well.

Next, the structure of thrust needle roller bearing 4 will be described with reference to FIG. 4. Thrust needle roller bearing 4 mainly includes a pair of bearing rings 40 and 41, a plurality of needle rollers 42 and an annular holder 43.

Bearing rings 40 and 41 have a shape of a circular disk and are arranged such that a main surface of one bearing ring faces a main surface of the other bearing ring. At a roller rolling surface 42A which is an outer circumferential surface of needle roller 42, needle roller 42 is in contact with bearing ring raceway surfaces 40A and 41A formed on one main surfaces of the pair of bearing rings 40 and 41 that face each other. In addition, needle rollers 42 are circumferentially arranged at a predetermined pitch by holder 43, and thus, are held on an annular raceway in a freely rolling manner. With such a configuration, the pair of bearing rings 40 and 41 of the thrust needle roller bearing are relatively rotatable with respect to each other.

Similarly to outer race 10, inner race 11 and ball 12, bearing rings 40 and 41 and needle roller 42 are each a bearing part according to the present embodiment. Therefore, in bearing rings 40 and 41 and needle roller 42, after high-temperature tempering is performed, a Vickers hardness at a position with a depth of 0.02×T+0.175 (mm) from the surface (bearing ring raceway surfaces 40A and 41A and roller rolling surface 42A) is higher than a Vickers hardness at a core portion, which is a region where the carbonitrided layer is not formed in a thickness direction of the bearing part (bearing rings 40 and 41 and needle roller 42), by not less than 80 HV, where T represents the time of carbonitriding treatment for forming the carbonitrided layer. This assures that a nitrogen concentration in the aforementioned surface of bearing rings 40 and 41 and needle roller 42 is not less than 0.4 mass %. As a result, a higher degree of safety is assured for thrust needle roller bearing 4 as well.

Next, a method for inspecting the bearing part according to the present embodiment will be described. In the method for inspecting the bearing part according to the present embodiment, it is possible to assure that the nitrogen concentration in the surface (outer race raceway surface 10A, inner race raceway surface 11A and ball rolling surface 12A) of outer race 10, inner race 11 and ball 12 is not less than 0.4 mass %.

Figure 5:
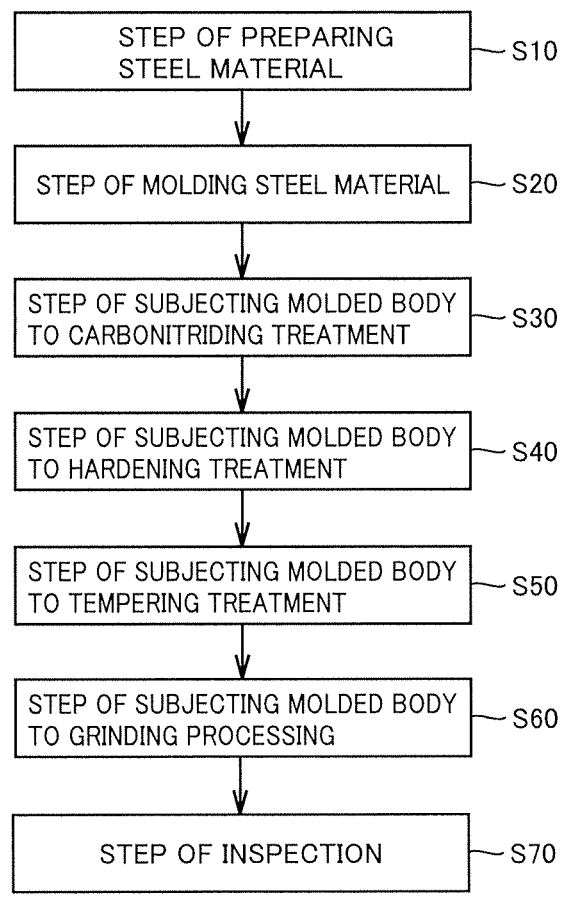
FIG. 5 is a flowchart schematically showing a method for manufacturing a bearing part.

In addition, the method for inspecting the bearing part according to the present embodiment is performed in a method for manufacturing the bearing part such as outer race 10, inner race 11 and ball 12. More specifically, referring to FIG. 5, the aforementioned method for manufacturing the bearing part includes the steps of: preparing a steel material (S10); molding the steel material (S20); subjecting the molded body to carbonitriding treatment (S30); subjecting the molded body to hardening treatment (S40); subjecting the molded body to tempering treatment (S50); subjecting the molded body to grinding processing (S60); and inspection (S70), and the method for inspecting the bearing part according to the present embodiment is performed in the step (S70). In the present specification, the step (S70) will be described in detail and the detailed description of the steps (S10) to (S60) will not be provided.

Figure 6:
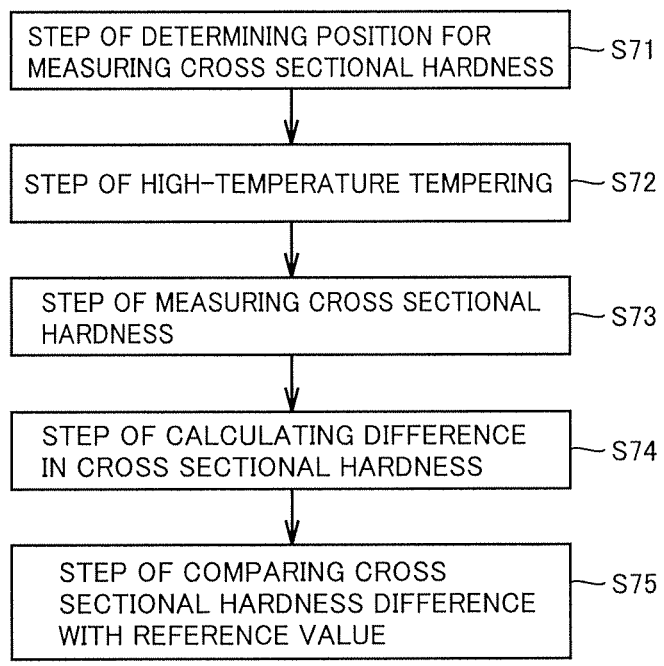
FIG. 6 is a flowchart schematically showing a method for inspecting the bearing part.

Referring to FIG. 6, in the method for inspecting the bearing part according to the present embodiment, a step of determining a position for measuring a cross sectional hardness is first performed as a step (S71). In this step (S71), by substituting the time (T) of the carbonitriding treatment into the equation of 0.02×T+0.175, the position with a depth for measuring the cross sectional hardness (Vickers hardness) in a step (S73) described below is calculated.

Next, a step of high-temperature tempering is performed as a step (S72). In this step (S72), the bearing part such as inner race 11 (see FIG. 1) is prepared and heat treatment is performed on the bearing part under conditions of a heating temperature of not less than 300° C. and not more than 700°

C. and a retention time of one hour. As a result, a Vickers hardness at a carbonitrided layer in inner race 11 becomes higher than a Vickers hardness at a core portion, which is a region where the carbonitrided layer is not formed. The heating temperature is more preferably not less than 400° C. and not more than 600° C., and further preferably 500° C.

Next, a step of measuring the cross sectional hardness is performed as a step (S73). In this step (S73), referring to FIG. 7, a test piece 14 is first cut out of inner race 11. Then, the Vickers hardness at the position with the depth calculated in the aforementioned step (S71) and the Vickers hardness at the aforementioned core portion are measured, respectively, from an outer circumferential surface 14A of test piece 14.

Next, a step of calculating a difference in cross sectional hardness is performed as a step (S74). In this step (S74), a difference (hereinafter referred to as "cross sectional hardness difference") between the Vickers hardness at the position with the depth calculated in the aforementioned step (S71) and the Vickers hardness at the aforementioned core portion is calculated from outer circumferential surface 14A.

Next, a step of comparing the cross sectional hardness difference with a reference value is performed as a step (S75). In this step (S75), the value of the cross sectional hardness difference calculated in the aforementioned step (S74) is compared with 80 ΔHV which is the predetermined reference value, and it is determined whether or not the cross sectional hardness difference is not less than 80 ΔHV. When the cross sectional hardness difference is not less than 80 ΔHV, it is possible to assure that the nitrogen concentration in the surface of inner race 11 before high-temperature tempering is not less than 0.4 mass % as described below. As described above, according to the method for inspecting the bearing part in accordance with the present embodiment, a high nitrogen concentration in the surface of the bearing part can be quantitatively assured.

Figure 8:
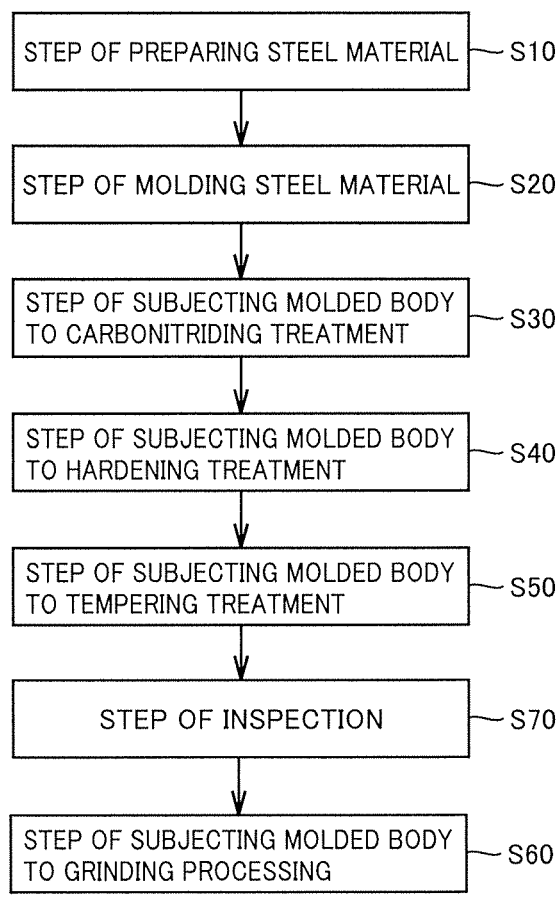
FIG. 8 is a flowchart schematically showing another method for manufacturing a bearing part.

Referring to FIG. 8, in the aforementioned method for manufacturing the bearing part, the step of inspection (S70) may not only be performed after the step of grinding processing (S60) but also be performed after the step of tempering treatment (S50). In this case, in the step of determining the position for measuring the cross sectional hardness (S71) (see FIG. 6), the position with the depth for measuring the Vickers hardness in the step (S73) described below is calculated by substituting the time (T) of the carbonitriding treatment and a thickness (t) of the bearing part removed by grinding processing into the equation of 0.02×T+0.175+t. As described above, the position for measuring the cross sectional hardness is determined with consideration preliminarily given to the thickness of the bearing part removed by grinding processing, and thus, it is possible to assure that the nitrogen concentration in the surface subjected to grinding processing is not less than 0.4 mass % even before the bearing part is subjected to grinding processing.

Example

In the present example, description will be provided of a method for determining the position for measuring the cross sectional hardness, the reference value of the cross sectional hardness difference and the like to assure that the nitrogen concentration in the surface of the bearing part is not less than 0.4 mass %.

(1) Test Piece and Experimental Method
(1-1) Introduction

Firstly, it is necessary to determine the heating temperature and the retention time in the high-temperature tempering which have a high correlation with the nitrogen concentration. Since transformation by the high-temperature tempering is a thermally-activated process, increasing the heating temperature and increasing the retention time have the same meaning, and it is considered meaningless to use the both as variables. Thus, in the present example, the optimum heating temperature was determined, by setting the retention time to a fixed time (one hour) and changing the heating temperature to 300° C., 400° C., 500° C., 600° C., and 700° C. to investigate a heating temperature at which a difference in hardness was clearest.

Further, it is considered that a difference in hardenability and a difference in cooling rate during hardening due to a difference in chemical components in each material may affect a hardness after the hardening and also may affect a hardness after the high-temperature tempering. Thus, in the present example, the absolute value itself of a cross sectional hardness is not used, but a hardness difference between a hardness at a non-nitrided position deep from a surface layer (core portion) (here, for example, a hardness at a depth of 1 mm from an uppermost surface subjected to heat treatment) and a hardness at a position with an arbitrary depth within a nitrided region was adopted as an indicator. Namely, the chemical components in each material may vary from material lot to material lot, and the hardness difference is for offsetting such a difference.

(1-2) Target Test Pieces

Table 1 shows chemical components of test pieces subjected to an investigation. The materials were all made of JIS standard SUJ2, and subjected to carbonitriding treatment in various heat treatment furnaces and under various heat treatment atmospheres. It is noted that the carbonitriding treatment temperature was included in a temperature range of not less than 840° C. and not more than 860° C.

TABLE 1

| Test Piece No. | Chemical Components (mass %) | | | | | | | |
|---|---|---|---|---|---|---|---|---|
| | C | Si | Mn | Ni | Cr | Mo | Cu | O* |
| 1 | 1.03 | 0.25 | 0.35 | 0.01 | 1.50 | 0 | 0.01 | 4 |
| 2 | | | | unknown | | | | |
| 3 | 0.98 | 0.27 | 0.47 | 0.05 | 1.45 | 0.02 | 0.10 | 6 |
| 4 | 1.00 | 0.27 | 0.35 | 0.02 | 1.51 | 0 | 0.01 | 7 |
| 5 | 1.01 | 0.24 | 0.35 | 0.01 | 1.49 | 0 | 0.01 | 3 |
| 6 | 0.99 | 0.26 | 0.37 | 0.02 | 1.44 | 0 | 0.01 | 5 |
| 7 | | | | unknown | | | | |
| 8 | 0.98 | 0.25 | 0.34 | 0.07 | 1.43 | 0.03 | 0.10 | 6 |
| 9 | 0.98 | 0.25 | 0.34 | 0.07 | 1.43 | 0.03 | 0.10 | 6 |
| 10 | 0.98 | 0.25 | 0.34 | 0.07 | 1.43 | 0.03 | 0.10 | 6 |

*ppm

Specifically, test piece No. 1 was subjected to treatment under conditions of a carbonitriding treatment temperature of 850° C., a treatment time of 120 minutes (min.) (hereinafter expressed as "850° C.×120 min."), an undecomposed ammonia fraction of 0.2 vol. %, and a carbon activity of 0.9. Test piece No. 2 was subjected to treatment under conditions of 840° C.×70 min., an undecomposed ammonia fraction of 0.1 vol. %, and a carbon activity of 0.85. Test piece No. 3 was subjected to treatment under conditions of 850° C.×120 min., an undecomposed ammonia fraction of 0.1 vol. %, and a carbon activity of 0.9. Test piece No. 4 was subjected to treatment under conditions of 850° C.×90 min., an undecomposed ammonia fraction of 0.1 vol. %, and a carbon activity of 0.9. Test piece No. 5 was subjected to treatment under conditions of 850° C.×90 min., an undecomposed ammonia fraction of 0.1 vol. %, and a carbon activity of 0.9.

In addition, test piece No. 6 was subjected to treatment under conditions of 850° C.×90 min., an undecomposed ammonia fraction of 0.13 vol. %, and a carbon activity of 0.9. Test piece No. 7 was subjected to treatment under conditions of 850° C.×150 min., an undecomposed ammonia fraction of 0.1 vol. %, and a carbon activity of 0.85. Test piece No. 8 was subjected to treatment under conditions of 850° C.×150 min., an undecomposed ammonia fraction of 0.25 vol. %, and a carbon activity of 0.9. Test piece No. 9 was subjected to treatment under conditions of 850° C.×180 min., an undecomposed ammonia fraction of 0.3 vol. %, and a carbon activity of 0.95. Test piece No. 10 was subjected to treatment under conditions of 850° C.×90 min., an undecomposed ammonia fraction of 0.2 vol. %, and a carbon activity of 0.9.

(1-3) Method for Measuring Nitrogen Concentration

In order to investigate correlation between a cross sectional hardness and a nitrogen concentration of a sample subjected to the high-temperature tempering, it is necessary to measure nitrogen concentration distribution in the sample (steel). Line analysis with an EPMA was used to measure the nitrogen concentration in the steel subjected to the carbonitriding treatment. Quantification was performed by analyzing a calibration test piece having a known nitrogen concentration and using a calibration curve thereof. A schematic view of a sample used for EPMA analysis and a measurement method is as shown in FIG. 7.

Figure 7:
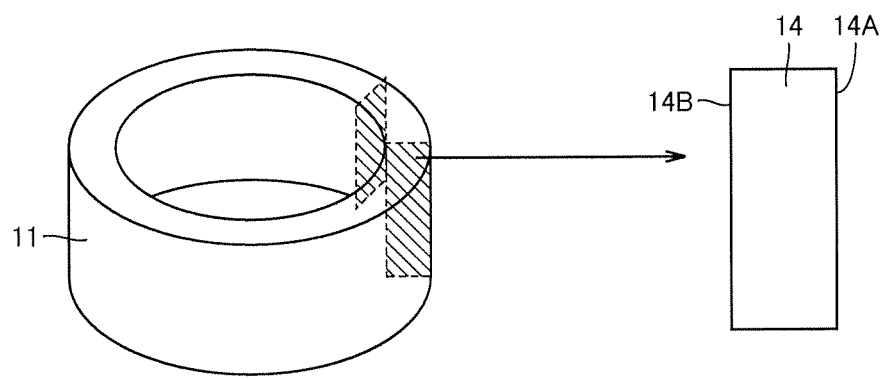
FIG. 7 is a schematic view for describing the method for inspecting the bearing part.

It is assumed that, for example, inner race 11 (see FIG. 1) is used as a sample as shown in FIG. 7. For the sample, a nitrogen concentration in the sample subjected to the carbonitriding treatment was measured. Specifically, test piece 14 as shown in FIG. 7 was cut out of the sample, and line analysis with an EPMA was performed on a cut-out end surface at a central portion in a height direction of test piece 14 (i.e., at a position with a half width) along a direction from outer circumferential surface 14A to inner circumferential surface 14B of the test piece.

(1-4) Method for Measuring Cross Sectional Hardness

Hardness was measured at the cut-out end surface subjected to the EPMA analysis in test piece 14 described above in (1-3). As a measuring method, Vickers hardness measurement was performed using a micro Vickers hardness tester.

(2) Search for Retention Temperature for High-Temperature Tempering (2-1) Experiment Description In order to search for a tempering temperature (heating temperature) having a high correlation with the nitrogen concentration, test pieces M subjected to the carbonitriding treatment were subjected to tempering at a heating temperature of 180° C. for a retention time of two hours, and thereafter subjected to five types of high-temperature tempering at heating temperatures of 300° C., 400° C., 500° C., 600° C., and 700° C. for a retention time of one hour. The high-temperature tempering was performed in an air atmosphere. Then, cross sectional hardnesses of the test pieces treated under the respective conditions for the high-temperature tempering were measured. Here, measurement was performed on test pieces No. 8 and No. 9 which were under carbonitriding treatment conditions considered to cause a large amount of nitrogen to enter the test pieces.

(2-2) Experimental Results

Figure 9:
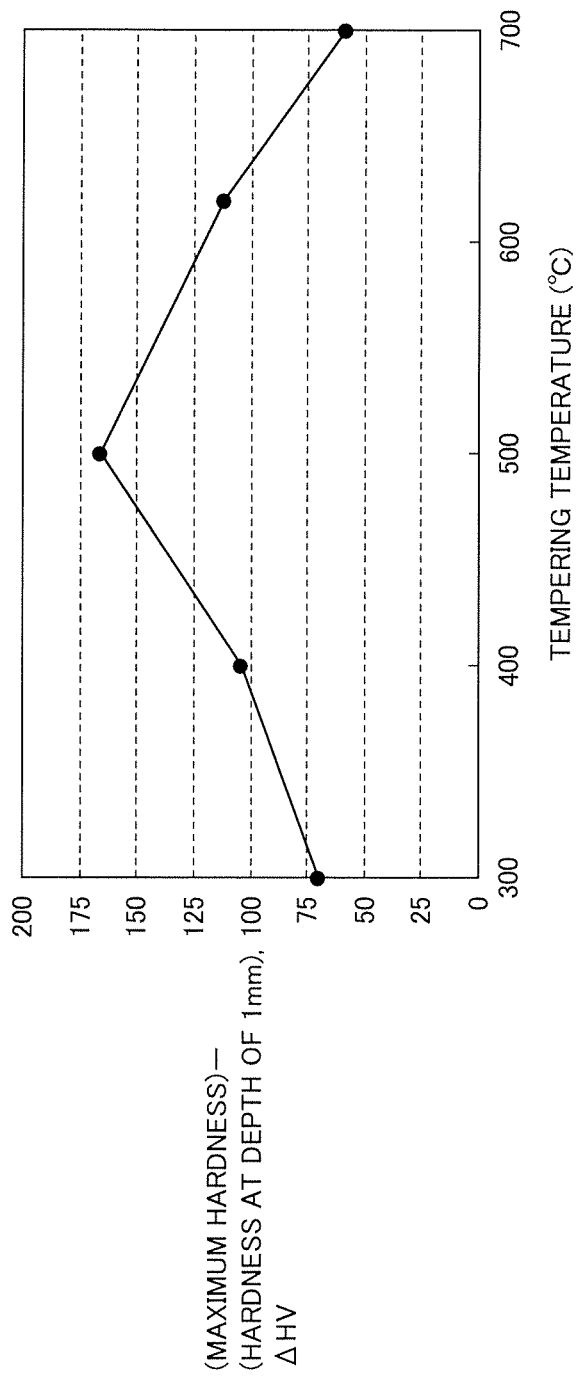
FIG. 9 is a graph showing a relationship between a tempering temperature and a cross sectional hardness difference.

FIG. 9 shows a graph compiling experimental results. The graph shown in FIG. 9 compiles the experimental results, with the tempering temperature on the axis of abscissas and the difference in cross sectional hardness (i.e., [the maximum value of the cross sectional hardness]−[the cross sectional hardness at a position with the depth of 1 mm from the uppermost surface subjected to the heat treatment]: also expressed as $\Delta HV$) on the axis of ordinates. As can be seen from FIG. 9, difference $\Delta HV$ in cross sectional hardness was maximum after the high-temperature tempering at the heating temperature of 500° C. for the retention time of one hour. Difference $\Delta HV$ in cross sectional hardness at the heating temperature of 500° C. had a value about double that of difference $\Delta HV$ in cross sectional hardness after the high-temperature tempering at the heating temperature of 300° C. or 700° C. Accordingly, it is considered that the hardness after the tempering having a relatively high correlation with the nitrogen concentration is the hardness after the tempering at a heating temperature of about 500° C. Therefore, in an experiment below, measurement of the cross sectional hardness was performed on the test pieces subjected to high-temperature tempering at a heating temperature of 500° C. for a retention time of one hour.

Figure 10:
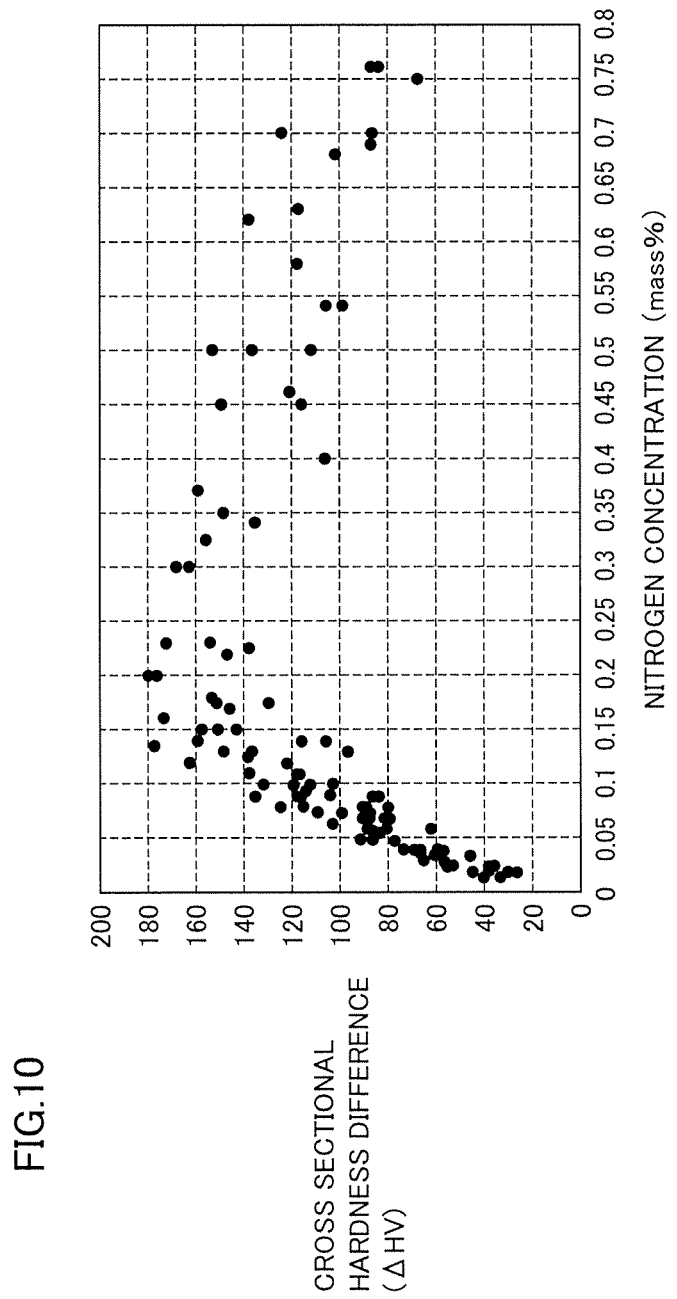
FIG. 10 is a graph showing a relationship between a nitrogen concentration and a cross sectional hardness difference.
Figure 11:
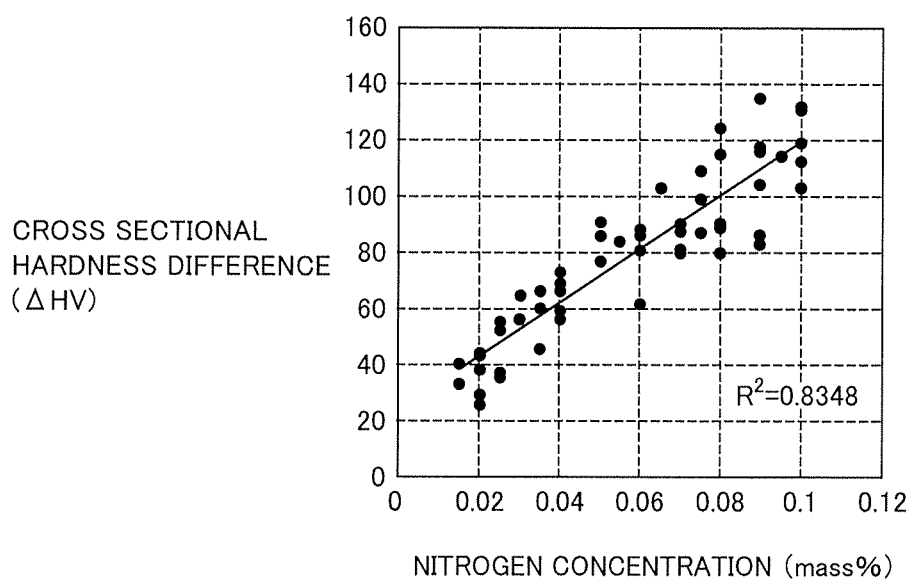
FIG. 11 is a graph showing a relationship between a nitrogen concentration and a cross sectional hardness difference when the nitrogen concentration is in a range of not more than 0.1 mass %.

(3) Investigation of Relationship Between Nitrogen Concentration and Difference ($\Delta HV$) in Cross Sectional Hardness Here, each test piece having a composition shown in Table 1 was subjected to the carbonitriding treatment, and further, the heat treatment at the heating temperature of 500° C. for the retention time of one hour as the high-temperature tempering, and thereafter a nitrogen concentration in each test piece 14 was measured by the EPMA analysis as described with reference to FIG. 7. The carbonitriding treatment was performed under conditions of a heating temperature of 850° C. and a value ($\gamma$) of carbon activity/undecomposed ammonia fraction of 4.75. Further, a cross sectional hardness in a depth direction of test piece 14 was measured in the cut-out end surface shown in FIG. 7. Then, relationship of a difference between a cross sectional hardness at a certain position in the depth direction and the cross sectional hardness at the position with the depth of 1 (mm) from the uppermost surface subjected to the heat treatment (a cross sectional hardness difference ($\Delta HV$)) was investigated. FIGS. 10 and 11 show results thereof.

In FIGS. 10 and 11, the axis of abscissas represents the nitrogen concentration (unit: mass %), and the axis of ordinates represents the cross sectional hardness difference ($\Delta HV$) (unit: Vickers hardness). FIG. 11 shows an excerpt, from FIG. 10, of a relationship between a nitrogen concentration and a cross sectional hardness difference when the nitrogen concentration is in a range of 0 to 0.1 mass %. It has been found from FIG. 10 that, when the nitrogen concentration is in a range of more than 0 and not more than 0.1 mass %, the correlation between the nitrogen concentration and the cross sectional hardness difference is strong, whereas when the nitrogen concentration is in a range of more than 0.1 mass %, the correlation between the nitrogen concentration and the cross sectional hardness difference is relatively weak. This is considered to be because incomplete hardening may occur in a region with a high nitrogen concentration, and nitrogen dissolved in the test piece does not necessarily contribute to a reduction in the decomposition rate of martensite. In addition, based on FIG. 11, when a correlation coefficient between the nitrogen concentration and the cross sectional hardness difference is calculated when the nitrogen concentration is in the range of more than 0 and not more than 0.1 mass %, a high correlation coefficient of 0.8348 is obtained therebetween. Accordingly, it is considered that the nitrogen concentration can be predicted from the cross sectional hardness difference if the nitrogen concentration is in the range of 0 to 0.1 mass %. Therefore, in an experiment below, a relationship between a nitrogen concentration of 0.06 mass % and a cross sectional hardness difference of 80 $\Delta HV$, which is a substantially intermediate position in a region (0 to 0.1 mass %) where the nitrogen concentration and the cross sectional hardness difference have a positive correlation, was used.

(4) Relationship Between Carbonitriding Treatment Time and Nitrogen Concentration Distribution In the case of the component of the rolling bearing, grinding processing is performed after hardening and tempering in order to adjust the shape thereof. Therefore, when the carbonitriding treatment is performed under certain treatment conditions, the nitrogen concentration in the product uppermost surface (raceway surface or rolling surface) changes due to an allowance of the grinding processing. Thus, in order to keep the nitrogen concentration in the product uppermost surface at not less than 0.4 mass %, it is necessary to change the conditions for the carbonitriding treatment in accordance with a grinding allowance for one surface.

Figure 12:
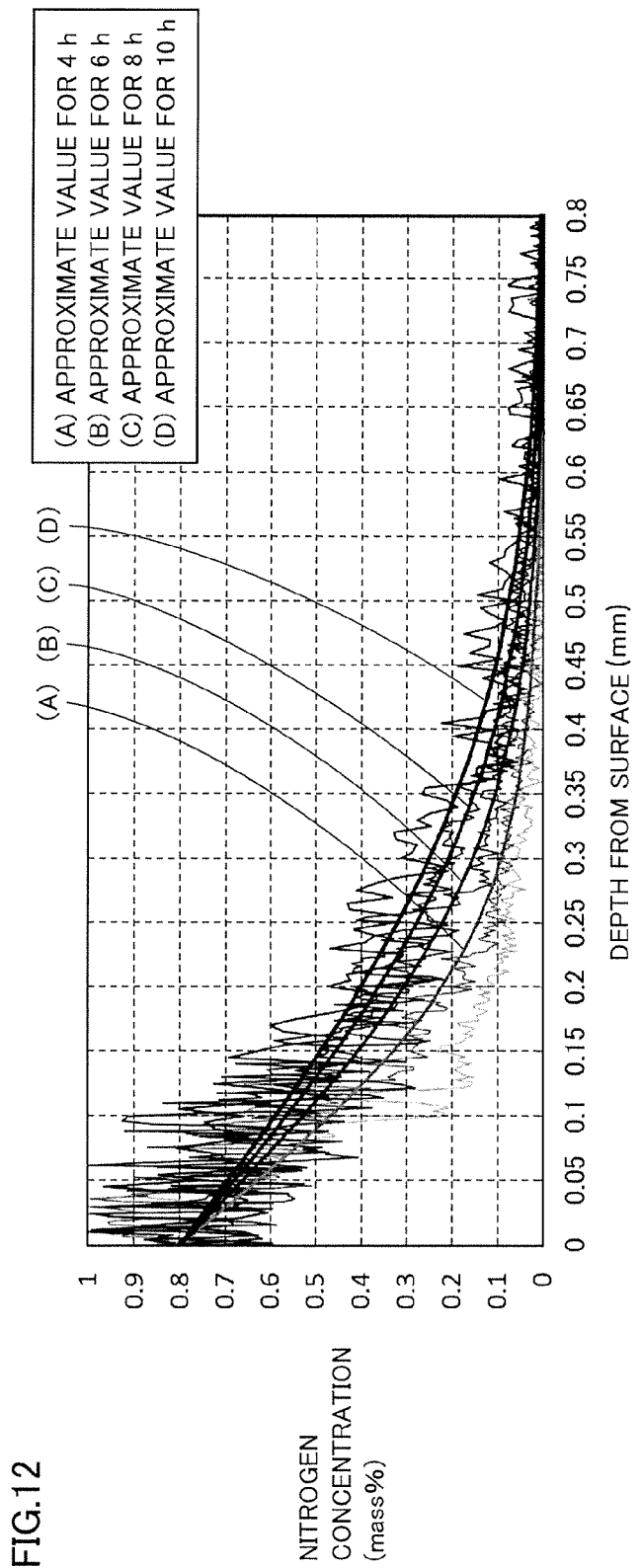
FIG. 12 is a graph showing a nitrogen concentration distribution in a steel material after carbonitriding treatment.

FIG. 12 shows a nitrogen concentration distribution (before the high-temperature tempering is performed) when a material of JIS standard SUJ2 is subjected to the carbonitriding treatment for treatment times of 4 hours ((A) in the figure), 6 hours ((B) in the figure), 8 hours ((C) in the figure), and 10 hours ((D) in the figure) under conditions of a heating temperature of 850° C. and a value ($\gamma$) of carbon activity/undecomposed ammonia fraction of 4.75. In FIG. 12, the axis of abscissas represents the depth (mm) from the surface of the SUJ2 material, and the axis of ordinates represents the nitrogen concentration (mass %). Here, when the carbonitriding treatment is performed under a condition of the $\gamma$ value larger than 5, the amount of nitrogen entry decreases and the region having a high nitrogen concentration is further biased toward the surface side. As a result, it becomes practically difficult to set the nitrogen concentration in the product surface at not less than 0.4 mass % by using a method other than a method for significantly increasing the treatment time. In addition, when the temperature of the carbonitriding treatment is not less than 860° C., it is difficult to keep the $\gamma$ value at not more than 5. When the temperature of the carbonitriding treatment is not more than 840° C., the diffusion speed of nitrogen into the steel decreases, and as a result, the treatment time becomes longer. Therefore, a temperature of about 850° C. is appropriate for the carbonitriding treatment of the SUJ2 material. It should be noted that the heating temperature at the time of the carbonitriding treatment can be determined by the size of the prior austenite crystal grain after hardening, and when the heating temperature is 850° C., the prior austenite crystal grain size is within a range of JIS standard No. 9 to No. 11 for the SUJ2 material.

It has been found from FIG. 12 that the nitrogen concentration in the product uppermost surface can be set at not less than 0.4 mass %, by setting the carbonitriding treatment time at 4 hours when the grinding allowance for one surface in the product uppermost surface is 0.125 (mm), by setting the carbonitriding treatment time at 6 hours when the grinding allowance for one surface in the product uppermost surface is 0.15 (mm), by setting the carbonitriding treatment time at 8 hours when the grinding allowance for one surface in the product uppermost surface is 0.175 (mm), and by setting the carbonitriding treatment time at 10 hours when the grinding allowance for one surface in the product uppermost surface is 0.2 (mm).

(5) Appropriate Position for Measuring Cross Sectional Hardness Difference

Figure 13:
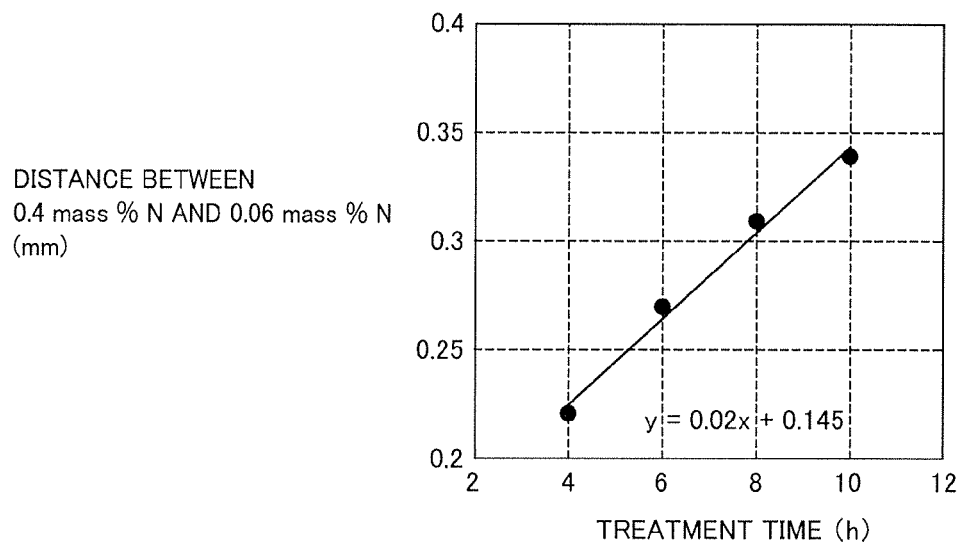
FIG. 13 is a graph showing a relationship between the carbonitriding treatment time and a distance between a depth position with 0.4 mass % and a depth position with 0.06 mass %.

A depth with 0.4 mass % and a depth with 0.06 mass % in each carbonitriding treatment time are obtained from FIG. 12, and a distance therebetween is plotted on the axis of ordinates and the treatment time is plotted on the axis of abscissas. Then, the graph shown in FIG. 13 is obtained. As described above, in order to assure that the nitrogen concentration in the product uppermost surface is not less than 0.04 mass % by using a relationship that the cross sectional hardness difference of 80 $\Delta$HV corresponds to the nitrogen concentration of 0.06 mass %, it is necessary to investigate a cross sectional hardness difference at a position with a depth of not less than the distance shown by the axis of ordinates in FIG. 12.

In addition, as described above, when the high-temperature tempering is performed at a heating temperature of 500° C. for a retention time of one hour, nitrogen in the steel is diffused into the inside by about 0.03 (mm). Thus, when 0.03 (mm) is added to the axis of ordinates in FIG. 13, an appropriate position for measuring the cross sectional hardness difference in each treatment time becomes a position with a depth shown by a value on the axis of ordinates in FIG. 14, i.e., a position with a depth of 0.02×T+0.175 (mm) (T: the carbonitriding treatment time). Therefore, if the cross sectional hardness difference at the position with the depth of 0.02×T+0.175 (mm) from the surface subjected to the high-temperature tempering is not less than 80 $\Delta$HV, it is possible to assure that the nitrogen concentration in the surface before the high-temperature tempering is not less than 0.4 mass %.

Figure 14:
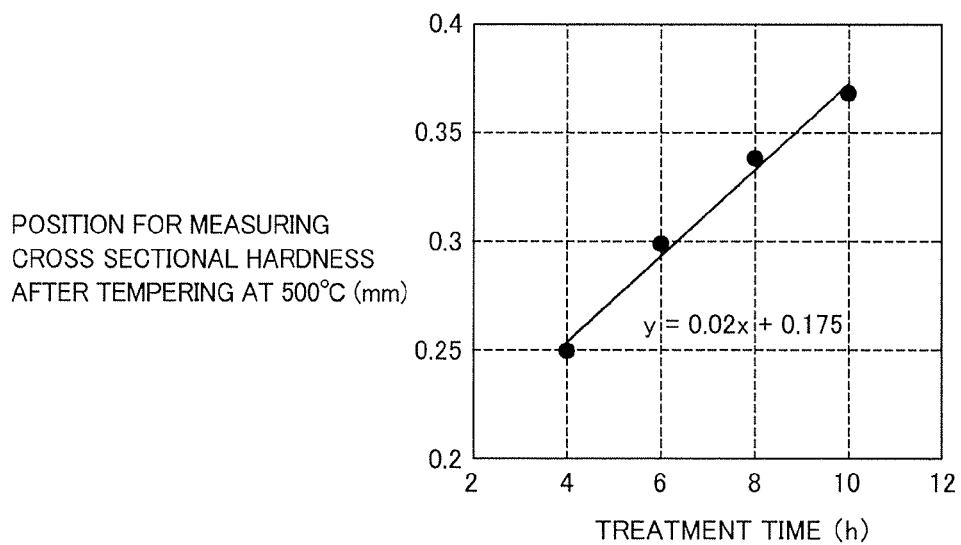
FIG. 14 is a graph showing a relationship between the carbonitriding treatment time and a distance between a depth position with 0.4 mass % and a depth position with 0.06 mass %.

(6) Grinding Allowance for One Surface in Raceway Surfaces of Inner Race and Outer Race of Rolling Bearing When the inner race and the outer race of the rolling bearing are hardened, deformation and dimensional change caused by heat treatment occur. The amount of this deformation and the amount of this dimensional change vary depending on the shape, thickness, cooling conditions, heating conditions and the like of the product. Therefore, an average amount of the grinding allowance for one surface in the inner race and the outer race is generally determined for each model number of the rolling bearing, by using an actual value as a reference. In the rolling bearing in which the inner race and the outer race have an outer diameter of not more than 150 (mm), an average value of the grinding allowance for one surface in the raceway surfaces is 0.1 to 0.2 (mm) in many cases. Therefore, if the nitrogen concentration distribution shown in FIG. 12 and the position for measuring the cross sectional hardness difference shown in FIG. 14 are clear, they may be sufficient for assuring that the nitrogen concentration in the raceway surfaces of the inner race and the outer race of the rolling bearing having an outer shape of not more than 150 (mm) is not less than 0.4 mass %.

(7) Procedure of Quality Assurance (7-1) Procedure of Quality Assurance After Heat Treatment Based on the examination results described above in (1) to (6), a procedure for assuring that the nitrogen concentration in the product uppermost surface subjected to the heat treatment (after the carbonitriding treatment, the hardening treatment and the tempering treatment and before the grinding processing) is not less than 0.4 mass % is as follows. First, the product dimension after the carbonitriding treatment, hardening and tempering is measured and an average value (t) of the grinding allowance for one surface in the raceway surfaces is calculated. Next, the time (T) of the carbonitriding treatment and the average value (t) of the grinding allowance for one surface are substituted into the equation of 0.02×T+0.175+t and the position for measuring the cross sectional hardness difference after the high-temperature tempering is calculated. Next, the high-temperature tempering (additional tempering) is performed at a heating temperature of 500° C. for a retention time of one hour.

Next, a test piece is cut out of the product subjected to the high-temperature tempering, and the cross sectional hardness difference at the measurement position calculated at the test piece is measured. Then, it is determined whether or not the value of the measured cross sectional hardness difference is not less than 80 ΔHV which is the reference value. As a result, if this value of the cross sectional hardness difference is not less than 80 ΔHV, it is possible to assure that the nitrogen concentration in the product uppermost surface is not less than 0.4 mass %.

(7-2) Procedure of Quality Assurance of Finished Product

Based on the examination results described above in (1) to (6), a procedure for assuring that the nitrogen concentration in the product uppermost surface after completion of the product (after the grinding processing) is not less than 0.4 mass % is as follows. First, the treatment time (T) of the carbonitriding treatment is substituted into the equation of 0.02×T+0.175 and the position for measuring the cross sectional hardness difference after the high-temperature tempering is calculated. Next, the high-temperature tempering is performed at a heating temperature of 500° C. for a retention time of one hour. Next, a test piece is cut out of the product subjected to the high-temperature tempering, and the cross sectional hardness difference at the measurement position calculated at the test piece is measured. Then, it is determined whether or not the value of the measured cross sectional hardness difference is not less than 80 ΔHV which is the reference value. As a result, if this value of the cross sectional hardness difference is not less than 80 ΔHV, it is possible to assure that the nitrogen concentration in the product uppermost surface is not less than 0.4 mass %.

It should be understood that the embodiment and the example disclosed herein are illustrative and not limitative in any respect. The scope of the present invention is defined by the terms of the claims, rather than the description above, and is intended to include any modifications within the scope and meaning equivalent to the terms of the claims.

INDUSTRIAL APPLICABILITY

The bearing part and the rolling bearing according to the present invention can be particularly advantageously applied to a bearing part having a carbonitrided layer formed in a surface thereof, and a rolling bearing including the bearing part.

REFERENCE SIGNS LIST

1 deep groove ball bearing; 2 conical roller bearing; 3 cylindrical roller bearing; 4 needle roller bearing; 10, 20, 30, 40 outer race; 10A, 20A, 30A, 40A outer race raceway surface; 11, 21, 31, 41 inner race; 11A, 21A, 31A, 41A inner race raceway surface; 12 ball; 12A ball rolling surface; 13, 23, 33, 43 holder; 14 test piece; 14A outer circumferential surface; 14B inner circumferential surface; 22, 32 roller; 22A, 32A, 42A roller rolling surface; 40, 41 bearing ring; 40A, 41A bearing ring raceway surface; 42 needle roller.

The invention claimed is:

1. A bearing part made of JIS standard SUJ2 and having a carbonitrided layer with a nitrogen content of at least 0.4 mass % formed in an uppermost surface thereof exposed by a grinding by carbonitriding treatment for forming said carbonitrided layer and performing a heat treatment at a heating temperature of 500° C. for a retention time of one hour, wherein, prior to said grinding to expose said uppermost surface, a Vickers hardness at a position with a depth of 0.02×T+0.175+t (mm) from an unground surface is higher than a Vickers hardness at a core portion, which is a region where said carbonitrided layer is not formed in a thickness direction of said bearing part, by not less than 80 HV, where T represents the time of said carbonitriding treatment and t (mm) represents a thickness of said bearing part removed by said grinding.

2. The bearing part according to claim 1, wherein the time of said carbonitriding treatment is not less than 4 hours and not more than 10 hours, and said thickness is not more than 0.125 mm.

3. The bearing part according to claim 1, wherein the time of said carbonitriding treatment is not less than 6 hours and not more than 8 hours, and said thickness is not more than 0.15 mm.

\* \* \* \* \*